United States Patent [19]

Schlatter et al.

[11] 4,150,978

[45] Apr. 24, 1979

[54] HIGH PERFORMANCE BEARING STEELS

[75] Inventors: Rene Schlatter; Robert S. Hodder, both of Latrobe, Pa.

[73] Assignee: Latrobe Steel Company, Latrobe, Pa.

[21] Appl. No.: 898,803

[22] Filed: Apr. 24, 1978

[51] Int. Cl.² .............................................. C22C 38/24
[52] U.S. Cl. ................. 75/126 C; 75/126 E; 148/37
[58] Field of Search .......... 75/126 E, 126 C; 148/37

[56] References Cited

U.S. PATENT DOCUMENTS

| 3,165,400 | 1/1965 | Roy et al. | 75/126 C |
| 3,167,423 | 1/1965 | Johnson, Jr. | 75/126 E |
| 3,859,147 | 1/1975 | Philip | 75/126 E |

FOREIGN PATENT DOCUMENTS

| 616484 | 3/1961 | Canada | 75/126 C |
| 50-41712 | 4/1975 | Japan | 75/126 C |
| 933882 | 8/1963 | United Kingdom | 75/126 C |
| 963184 | 7/1964 | United Kingdom | 75/126 C |

*Primary Examiner*—Arthur J. Steiner
*Attorney, Agent, or Firm*—Buell, Blenko & Ziesenheim

[57] ABSTRACT

A wear and corrosion resistant steel bearing and article are provided characterized by superior rolling contact fatigue life and consisting essentially of

| C | about | 0.8 – 1.6% | |
| Si | about | 0.50% | Max. |
| Mn | about | 0.50% | Max. |
| S | about | 0.10% | Max. |
| P | about | 0.015% | Max. |
| Cr | about | 12 – 20% | |
| Mo | about | 2 – 5% | |
| W | about | Up to 3.0% | |
| V | about | 0.5% – 3.0% | |
| Ti | about | Up to 0.5% | |
| Al | about | 0.03% | Max. |
| Ni | about | 0.50% | Max. |
| Co | about | 0.50% | Max. |
| Cu | about | 0.50% | Max. |
| B | about | 0.05% | Max. |
| N | about | 0.05% | Max. |
| Fe + incidental impurities | Balance | | |

The steel is made by vacuum induction melting and forming into electrodes and then vacuum arc remelting said electrodes into an ingot for subsequent working into articles.

12 Claims, 1 Drawing Figure

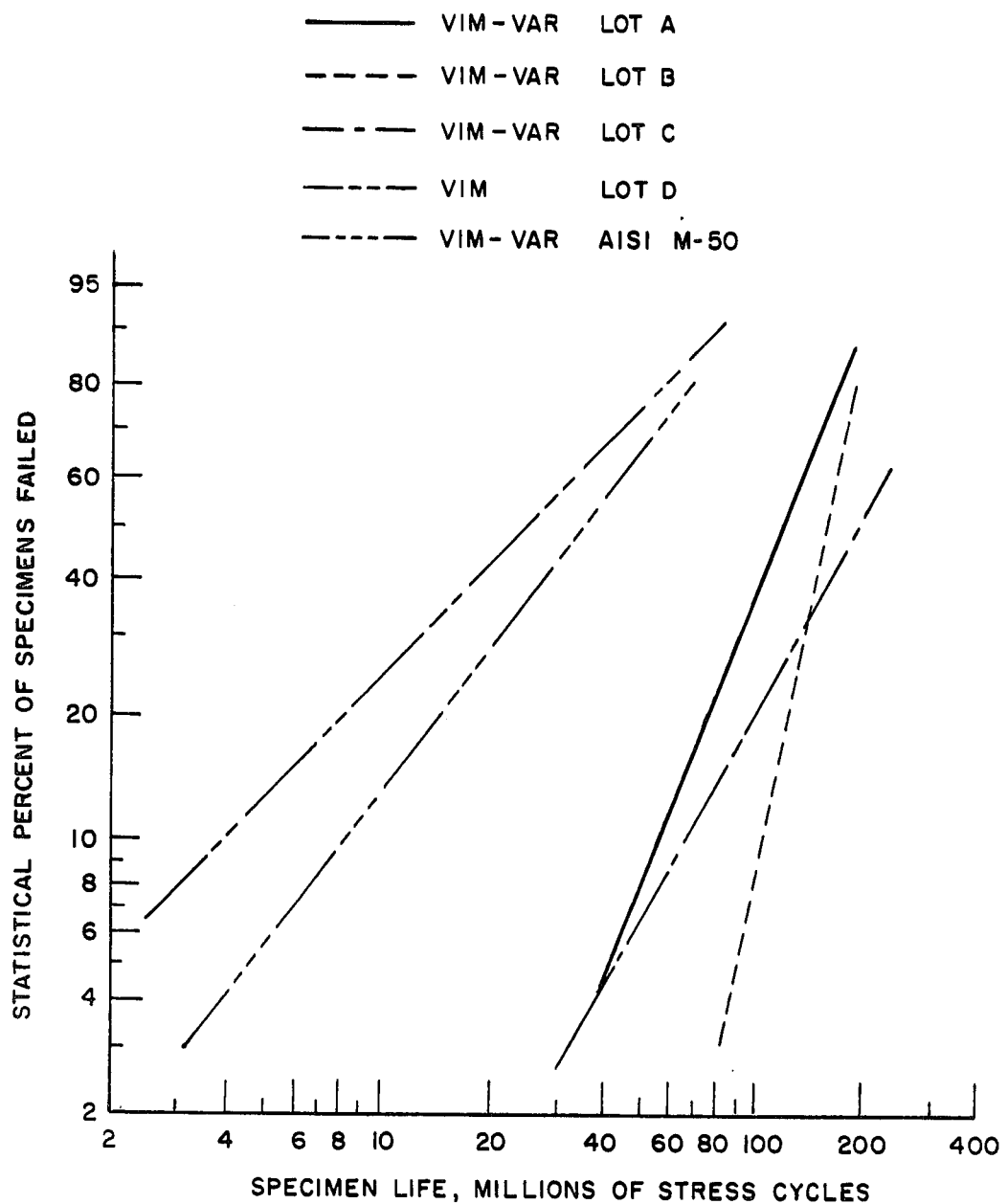

HIGH PERFORMANCE BEARING STEELS

This invention relates to high performance bearing steel and manufacture of same and particularly to an improved corrosion resistant, wear and elevated temperature resistant bearing steel with superior rolling contact fatigue life.

There has long been a demand in the aerospace industry and in other industries as well where corrosion resistance, wear and elevated temperatures are a problem for a bearing steel having superior rolling contact fatigue life.

There have been, in the past, several steels suggested and used in this demanding area. Unfortunately, however, each of the suggested steels has been lacking in one or more of the properties desired for optimum performance in critical applications. These desired properties are: high hardness, good hot hardness, retention of hardness after exposure to elevated temperatures, good corrosion and oxidation resistance, good wear resistance and, perhaps most difficult to obtain, superior rolling contact fatigue life.

The prior art steel which probably most nearly embodied all of these properties is that disclosed in U.S. Pat. No. 3,167,423. However, it clearly lacked ample rolling contact fatigue properties.

We have discovered an alloy which combines all of the properties required for aircraft bearings and the like operating at elevated temperatures and/or in corrosive environments, particularly superior fatigue life. Advanced manufacturing techniques in melting and working the alloy are employed to further promote and improve the required product properties. Processing characteristics are also satisfactory, so the alloy may be readily formed, machined and heat treated to the final high hardness.

The composition range of this alloy includes the following elements:

| C | about | 0.8 – 1.6% | |
|---|---|---|---|
| Si | about | 0.50% | Max. |
| Mn | about | 0.50% | Max. |
| S | about | 0.10% | Max. |
| P | about | 0.015% | Max. |
| Cr | about | 12 – 20% | |
| Mo | about | 2 – 5% | |
| W | about | Up to 3.0% | |
| V | about | 0.5% – 3.0% | |
| Ti | about | Up to 0.5% | |
| Al | about | 0.03% | Max. |
| Ni | about | 0.50% | Max. |
| Co | about | 0.50% | Max. |
| Cu | about | 0.50% | Max. |
| B | about | 0.05% | Max. |
| N | about | 0.05% | Max. |
| Fe + incidental impurities | Balance | | |

In practice the composition of the alloy is preferably maintained within the following considerably narrower range:

| C | about 1.0%–1.2% |
|---|---|
| Si | about 0.2–0.4% |
| Mn | about 0.3–0.5% |
| S | about 0.010% Max. |
| P | about 0.015% Max. |
| Cr | about 14%–16% |
| Mo | about 1.5%–2.5% |
| W | about 2.3%–2.7% |
| V | about 1%–1.5% |
| Ti | about Up to 0.5% |
| Al | about 0.03% Max. |
| Ni | about 0.50% Max. |
| Co | about 0.50% Max. |
| Cu | about 0.50% Max. |
| B | about 0.05% Max. |
| N | about 0.05% Max. |
| Fe + incidental impurities | Balance |

In order to obtain the unique characteristics of this invention, it is necessary to maintain the level of oxygen, hydrogen, aluminum and silicon as low as possible in order to provide superior microcleanliness and to avoid formation of delta ferrite, the presence of which would significantly reduce the attainable heat treated hardness. It is also essential to maintain a low level of manganese, nickel, cobalt, copper and nitrogen in order to reduce the presence of retained austenite, the presence of which in objectionable quantities (>5%) is likely to result in dimensional instability that cannot be tolerated in critical applications.

We have also discovered that tungsten is beneficial and can be substituted for molybdenum at a ratio of about 1:1.5. The presence of tungsten enhances the rolling contact fatigue properties, refines the grain size, even at increased hardening temperatures, provides a desirable balance with regard to the various carbides formed in the alloy system and finally aids in reducing the retained austenite level.

We have also discovered that the method of production of this alloy is critical to obtaining its unique properties, particularly its high level of rolling contact fatigue. We have found that primary vacuum induction melting of this high performance bearing alloy is an absolute necessity to achieve consistently the superior fatigue properties required in aircraft and other high load bearing applications operating at elevated temperatures. This melting process permits the production of the alloy under well controlled and highly reproducible conditions to quality standards not attainable with air melting practices. In particular, the content of non-metallic macro- and microinclusions is drastically reduced in the electrodes cast for subsequent vacuum arc remelting and the alloy composition is maintained within the narrow limits required for optimum property response.

Proper selection of the crucible refractory and furnace pressure is mandatory to minimize undesirable reactions between the high carbon alloy and the oxide refractory of the induction crucible; otherwise, such reaction leads to rapid refractory erosion and poor cleanliness in the master alloy. We have found that magnesia and magnesia-alumina spinel of high purity are the most suitable refractory materials. Pressure levels up to 50 mm Hg may be employed to suppress metal-refractory reactions during a major portion of the melting process. Casting of the electrodes is generally carried out under a partial pressure of inert gas to control any boiling reaction in the molds.

Vacuum arc remelting of the vacuum cast electrodes, properly heat treated and ground, is performed under a partial inert gas atmosphere at a pressure level permitting stable arc conditions. Because of the strong tendency of the alloy to macro-segregation, the vacuum arc remelting parameters must be selected and maintained with utmost care. We have discovered that a pressure range of 1 to 20 mm Hg is satisfactory for melt rates of 2-7 kg/min., giving an ingot structure free of macrosegregation. The inert gas for partial pressurization of the furnace atmosphere is preferably selected from the family of noble gases. After completion of the constant burn-off cycle, the current is adequately reduced for the hot topping step to minimize the formation of shrinkage cavities in the top of the ingot; this is common practice in vacuum arc melting. The ingot is then removed from the crucible, slowly cooled and annealed prior to forging and rolling to bar products.

Thermo-mechanical processing of the alloy is carried out in the temperature range of 1050° to 1190° C. after adequate thermal homogenizing of the ingot. Initial forging on a hydraulic press must proceed slowly in small reduction steps, and frequent reheating of the material is required to reduce surface tearing and material losses due to cracking. A total forging reduction of at least 5:1 is recommended before further working on a cogging or rolling mill is performed. Blooms and billets are thoroughly ground at appropriate sizes to remove surface defects prior to further working. Subsequent finish rolling to final bar product follows, using working temperatures in the range of 1000°–1150° C.

In the foregoing general description, we have set out certain objects, purposes and advantages of our invention. Other objects, purposes and advantages will be apparent from the following description and examples and from the drawing which is a graph showing a comparison of fatigue results of the alloy of this invention with prior art alloys.

EXAMPLE I

A tungsten-bearing alloy "MB" of the following composition, according to this invention:

| | |
|---|---|
| C | 1.07% |
| Si | 0.35% |
| Mn | 0.44% |
| W | 2.56% |
| Cr | 14.72% |
| V | 1.18% |
| Mo | 1.75% |
| Ni | 0.19% |
| Cu | 0.05% |
| Al | 0.01% | was produced by double vacuum melting and subjected to rolling contact fatigue testing. The heat treatment of the 10 mm rd. specimens consisted of the following steps:

| | | |
|---|---|---|
| Austenitize | 2100° F. | (1149° C.) /30 min. |
| Quench to Air cool | 1050° F. | (566° C.) |
| Stress relieve | 300° F. | (149° C.) /1 hr. |
| Refrigerate | −100° F. | (−74° C.) /15 min. |
| Temper | 970° F. | (521° C.) /2+2 hrs. + |
| | 975° F. | (524° C.) /2 hrs + |
| | 985° F. | (529° C.) /2 hrs. |

The following test conditions were employed in RCF testing:

| | |
|---|---|
| Max. Hertz Stress | 4826 MPa (700 ksi) |
| Speed | 6.3 m/sec. (25 000 cycles/min) |
| Lubricant | MIL-L-7808 |
| Temperature | Room - ambient |

Alloy of U.S. Pat. No. 3,167,423 was prepared by double vacuum melting and treated according to the teachings of the patent.

The results of these tests appear in Table 1.

Table 1.

| ROLLING CONTACT (RC Rig) FATIGUE TEST RESULTS | | |
|---|---|---|
| | Alloy "B" | Alloy "MB" |
| B-10 Life (× $10^{-6}$ Cycles) | 2.43 | 2.81 |
| B-50 Life (× $10^{-6}$ cycles) | 6.19 | 9.04 |
| Weibull Slope | 2.01 | 1.61 |
| Correlation Coefficient | .88 | .90 |
| Hardness Rc | 61.6 | 61.8 |
| Retained Austenite | 5.0% | 3.0% |

The increase in fatigue life of the alloy of this invention (MB) over the alloy of U.S. Pat. No. 3,167,423 (B) is significant.

EXAMPLE II

Five ball fatigue tests of three lots of alloy balls produced via the teachings of this new invention, using the vacuum induction melting technique (VIM) followed by vacuum arc remelting (VAR), was conducted and the resulting data were compared to data on a lot of VIM Alloy "B" balls, produced via the teachings of U.S. Pat. No. 3,167,423. For a second comparison, comparable data generated from VIM-VAR M50 Balls are included. These data clearly illustrate two favorable comparisons for the new invention, namely:

1. At a 10% life level, the new invention material is from 14 to 28 times superior to that of material representative of U.S. Pat. No. 3,167,423.
2. At a 10% life level the new invention material is from 6–12 times superior to that of premimum quality VIM-VAR M50, which is representative of material that is currently a very popular material for use in critical main shaft jet aircraft bearings.

The test data are set out in Table 2 and graphically summarized in the accompanying drawing. The three lots of balls according to this invention are identified as A, B and C. The balls according to U.S. Pat. No. 3,167,423 are identified as D and the balls of M50 steel are identified as E.

Table 2.

| FATIGUE RESULTS WITH 1.27-CM-(½-INCH-) DIAMETER BALLS RUN IN FIVE-BALL FATIGUE TESTER | | | | | |
|---|---|---|---|---|---|
| [Maximum Hertz stress, 5520 MPa (800 000 psi); contact angle, 30°; shaft speed, 10 000 rpm; temperature, 340° K. (150° F.).] | | | | | |
| | Fatigue life, millions of upper ball stress cycles | | | | Confidence |
| Material | 10-Percent life | 50-Percent life | Slope | Failure index[a] | number, percent[b] |
| A | 56.7 | 120 | 2.50 | 31 of 40 | 97 |
| B | 112 | 164 | 4.94 | 20 of 30 | — |
| C | 66.4 | 192 | 1.77 | 10 of 21 | 87 |
| D | 3.9 | 26.3 | 0.99 | 29 of 30 | >99 |
| E | 8.9 | 36.6 | 1.33 | 34 of 40 | >99 |

[a]Indicates number of failures out of total number of tests.
[b]Probability, expressed as a percentage, that lot B (baseline) has a 10-percent, fatigue life greater than that of the particular lot being considered.

It can be seen from the foregoing test data that the alloy of the present invention provides a solution to the problem of bearing contact fatigue as well as the problems of hardness, corrosion resistance, etc. faced by the aircraft industry.

While we have described certain preferred practices and embodiments of our invention in the foregoing disclosure, it will be understood that this invention may be otherwise embodied within the scope of the following claims.

We claim:

1. A wear and corrosion resistant steel characterized by superior rollings contact fatigue life and low retained austenite consisting essentially of:

| C | about | 0.8 – 1.6% | |
|---|---|---|---|
| Si | about | 0.50% | Max. |
| Mn | about | 0.50% | Max. |
| S | about | 0.10% | Max. |
| P | about | 0.015% | Max. |
| Cr | about | 12 – 20% | |
| Mo | about | 2 – 5% | |
| W | about | Up to 3.0% | |
| V | about | 0.5% – 3.0% | |
| Ti | about | Up to 0.5% | |
| Al | about | 0.03% | Max. |
| Ni | about | 0.50% | Max. |
| Co | about | 0.50% | Max. |
| Cu | about | 0.50% | Max. |
| B | about | 0.05% | Max. |
| N | about | 0.05% | Max. |
| Fe + incidental impurities | Balance | | | and having been made by vacuum arc remelting electrodes prepared by vacuum induction melting.

2. A wear and corrosion resistant steel as claimed in claim 1 having the composition:

| C | about 1.0%–1.2% |
|---|---|
| Si | about 0.2–0.4% |
| Mn | about 0.3–0.5% |
| S | about 0.010% Max. |
| P | about 0.015% Max. |
| Cr | about 14%–16% |
| Mo | about 1.5%–2.5% |
| W | about 2.3%–2.7% |
| V | about 1%–1.5% |
| Ti | about Up to 0.5% |
| Al | about 0.03% Max. |
| Ni | about 0.50% Max. |
| Co | about 0.50% Max. |
| Cu | about 0.50% Max. |
| B | about 0.05% Max. |
| N | about 0.05% Max. |
| Fe + incidental impurities | Balance |

3. A steel as claimed in claim 1 made by vaccum induction melting the steel and casting into electrodes and thereafter vacuum arc remelting said electrodes into ingots.

4. A steel as claimed in claim 2 made by vacuum induction melting the steel and casting into electrodes and thereafter vacuum arc remelting said electrodes into ingots.

5. A steel as claimed in claim 3 or 4 wherein the retained austenite does not exceed about 5%.

6. A ferrous alloy bearing consisting essentially of:

| C | about | 0.8 – 1.6% | |
|---|---|---|---|
| Si | about | 0.50% | Max. |
| Mn | about | 0.50% | Max. |
| S | about | 0.10% | Max. |
| P | about | 0.015% | Max. |
| Cr | about | 12 – 20% | |
| Mo | about | 2 – 5% | |
| W | about | Up to 3.0% | |
| V | about | 0.5% – 3.0% | |
| Ti | about | Up to 0.5% | |
| Al | about | 0.03% | Max. |
| Ni | about | 0.50% | Max. |
| Co | about | 0.50% | Max. |
| Cu | about | 0.50% | Max. |
| B | about | 0.05% | Max. |
| N | about | 0.05% | Max. |
| Fe + incidental impurities | Balance | | | said bearing being characterized by hot hardness, wear resistance and corrosion resistance at elevatd temperatures, low retained austenite and by superior rolling contact fatigue life and having been made by vacuum arc remelting electrodes prepared by vacuum induction melting.

7. A ferrous alloy bearing as claimed in claim 6 having the composition:

| C | about 1.0%–1.2% |
|---|---|
| Si | about 0.2–0.4% |
| Mn | about 0.3–0.5% |
| S | about 0.010% Max. |
| P | about 0.015% Max. |
| Cr | about 14%–16% |
| Mo | about 1.5%–2.5% |
| W | about 2.3%–2.7% |
| V | about 1%–1.5% |
| Ti | about Up to 0.5% |
| Al | about 0.03% Max. |
| Ni | about 0.50% Max. |
| Co | about 0.50% Max. |
| Cu | about 0.50% Max. |
| B | about 0.05% Max. |
| N | about 0.05% Max. |
| Fe + incidental impurities | Balance |

8. A ferrous alloy bearing as claimed in claim 6 or 7 made by vacuum induction melting the steel and casting into electrodes, vacuum arc remelting said electrodes into ingots and forming said ingots into bearings.

9. A ferrous alloy bearing as claimed in claim 6 or 7 wherein the retained austenite does not exceed about 5%.

10. A ferrous alloy article consisting essentially of:

| C | about | 0.8 – 1.6% | |
|---|---|---|---|
| Si | about | 0.50% | Max. |
| Mn | about | 0.50% | Max. |
| S | about | 0.10% | Max. |
| P | about | 0.015% | Max. |
| Cr | about | 12 – 20% | |
| Mo | about | 2 – 5% | |
| W | about | Up to 3.0% | |
| V | about | 0.5% – 3.0% | |
| Ti | about | Up to 0.5% | |
| Al | about | 0.03% | Max. |
| Ni | about | 0.50% | Max. |
| Co | about | 0.50% | Max. |
| Cu | about | 0.50% | Max. |
| B | about | 0.05% | Max. |
| N | about | 0.05% | Max. |
| Fe + incidental impurities | Balance | | | said article being characterized by hot hardness wear resistance and corrosion resistance at elevated temperatures and by superior rolling contact fatigue life, and having been made by vacuum arc remelting an electrode prepared by vacuum induction melting.

11. A ferrous alloy article as claimed in claim 10 having the composition:

| C | about 1.0%–1.2% |
|---|---|
| Si | about 0.2–0.4% |

UNITED STATES PATENT AND TRADEMARK OFFICE
CERTIFICATE OF CORRECTION

PATENT NO. : 4,150,978
DATED : April 24, 1979
INVENTOR(S) : Rene Schlatter and Robert S. Hodder It is certified that error appears in the above-identified patent and that said Letters Patent are hereby corrected as shown below:

Column 1, line 44, in the third tabulated column, "0.10%" should be -- 0.010% --.

Column 6, line 9, "elevatd" should be --elevated--.

Signed and Sealed this

Twenty-first Day of August 1979

[SEAL]

Attest:

LUTRELLE F. PARKER
*Attesting Officer*    *Acting Commissioner of Patents and Trademarks*